US012582576B2

(12) United States Patent
Wyler et al.

(10) Patent No.: US 12,582,576 B2
(45) **Date of Patent: *Mar. 24, 2026**

(54) PRIMARY PACKAGING

(71) Applicant: SHL Medical AG, Zug (CH)

(72) Inventors: Samuel Wyler, Abtwil (CH); Ludwig Weibel, Waldstatt (CH)

(73) Assignee: SHL Medical AG, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,382

(22) Filed: Apr. 9, 2024

(65) Prior Publication Data

US 2024/0269038 A1 Aug. 15, 2024

Related U.S. Application Data

(63) Continuation of application No. 16/652,876, filed as application No. PCT/EP2018/076710 on Oct. 2, 2018, now Pat. No. 11,992,456.

(30) Foreign Application Priority Data

Oct. 2, 2017 (EP) .................................... 17194377

(51) Int. Cl.
*A61J 1/10* (2006.01)
*A61J 1/14* (2023.01)
*A61J 1/20* (2006.01)

(52) U.S. Cl.
CPC ............... *A61J 1/10* (2013.01); *A61J 1/1406* (2013.01); *A61J 1/2041* (2015.05)

(58) Field of Classification Search
CPC .......... A61J 1/10; A61J 1/1406; A61J 1/1475; A61J 1/2093; A61J 1/1412; A61J 1/201;
(Continued)

(56) References Cited

U.S. PATENT DOCUMENTS 4,212,299 A * 7/1980 Yokokoji ................ B32B 27/36 604/408
4,254,884 A 3/1981 Maruyama
(Continued)

FOREIGN PATENT DOCUMENTS

CN 1767799 A 5/2006
CN 1791439 A 6/2006
(Continued)

OTHER PUBLICATIONS

Chinese Office Action for CN Application No. 201880064482.3, Issued Jul. 18, 2023.

(Continued)

*Primary Examiner* — Rebecca E Eisenberg
*Assistant Examiner* — Brandon W. Levy
(74) *Attorney, Agent, or Firm* — McDonnell Boehnen Hulbert & Berghoff LLP

(57) ABSTRACT

A primary packaging for a liquid is presented including an at least partially collapsible container and a connector element for connection of the primary packaging to a withdrawal device. The connector element has at least one connector channel which is in fluid communication with an interior space of the container. The container is composed at least partially of a foil which is constructed from a first layer which, during intended use of the primary packaging, comes into direct contact with the liquid. Both the first layer and the connector element are composed of a plastics material including at least one cyclic olefin polymer.

19 Claims, 7 Drawing Sheets

(58) Field of Classification Search

CPC ...... A61J 1/1425; A61J 1/2041; A61J 1/2048; A61J 1/2034; A61J 1/2096; B32B 27/08; B32B 27/32; B32B 2439/80; B32B 2439/46; B32B 1/02; B32B 3/08; B32B 7/12; B32B 27/304; B32B 27/322; B32B 27/325; B32B 2250/02; B32B 2250/24; B32B 2307/7244; B32B 2307/7246; B32B 2307/732; B29C 66/71

See application file for complete search history.

(56) References Cited

U.S. PATENT DOCUMENTS

| | | | | |
|---|---|---|---|---|
| 4,516,977 | A | 5/1985 | Herbert | |
| 4,596,573 | A * | 6/1986 | Donnan | A61J 1/10 D24/118 |
| 4,991,267 | A * | 2/1991 | Apperson | A61J 1/14 24/30.5 R |
| 5,291,991 | A * | 3/1994 | Meyer | A61J 1/2093 206/568 |
| 5,364,384 | A | 11/1994 | Grabenkort | |
| 2003/0065149 | A1 | 4/2003 | MGinnis | |
| 2003/0075469 | A1* | 4/2003 | Herbert | A61J 1/10 206/438 |
| 2004/0116869 | A1 | 6/2004 | Heinz | |
| 2005/0059951 | A1* | 3/2005 | Young | A61J 1/10 604/403 |
| 2006/0276769 | A1 | 12/2006 | Domkowski | |
| 2007/0000573 | A1* | 1/2007 | Py | B65B 51/10 141/329 |
| 2008/0009783 | A1* | 1/2008 | Branderburger | A61M 39/20 604/30 |
| 2008/0140016 | A1 | 6/2008 | Heinz | |
| 2011/0007987 | A1 | 1/2011 | Davideit | |
| 2011/0135223 | A1* | 6/2011 | Suzuki | B65D 75/5883 383/114 |
| 2011/0256373 | A1 | 10/2011 | Tatarka | |
| 2013/0156983 | A1* | 6/2013 | Pham | B32B 27/08 428/36.7 |
| 2013/0306169 | A1 | 11/2013 | Weibel | |
| 2015/0018788 | A1 | 1/2015 | Pham | |

FOREIGN PATENT DOCUMENTS

| | | | | |
|---|---|---|---|---|
| CN | 101001782 | A | 7/2007 | |
| CN | 101018714 | A | 8/2007 | |
| CN | 101596962 | A | 12/2009 | |
| CN | 101909575 | A | 12/2010 | |
| CN | 102429821 | A | 5/2012 | |
| CN | 202288830 | U | 7/2012 | |
| CN | 202342465 | U | 7/2012 | |
| CN | 103393539 | A | 11/2013 | |
| CN | 105581906 | A | 5/2016 | |
| CN | 106458352 | A | 2/2017 | |
| CN | 108135774 | A | 6/2018 | |
| CN | 108025834 | B | 7/2021 | |
| EP | 1407750 | B1 | 4/2008 | |
| EP | 2226059 | A1 | 9/2010 | |
| EP | 2330048 | A1 | 6/2011 | |
| EP | 2377504 | A1 | 10/2011 | |
| JP | 2006089047 | A | 4/2006 | |
| JP | 2009136619 | A | 6/2009 | |
| JP | 2013086829 | A | 5/2013 | |
| JP | 2016052903 | A | 4/2016 | |
| KR | 200444613 | Y1 * | 5/2009 | A61J 1/10 |
| KR | 20090086736 | A | 8/2009 | |
| KR | 20100004601 | U | 5/2010 | |
| KR | 20140146547 | A | 12/2014 | |
| WO | 199425252 | A1 | 11/1994 | |
| WO | WO-2016196632 | A1 * | 12/2016 | A61J 1/1475 |

OTHER PUBLICATIONS

International Search Rreport corresponding to PCT/EP2018/076710 Mailed Nov. 15, 2018.

Written Opinion corresponding to PCT/EP2018/076710 Mailed Nov. 15, 2018.

* cited by examiner

PRIMARY PACKAGING

CROSS REFERENCE TO RELATED APPLICATIONS

The present application a continuation of U.S. patent application Ser. No. 16/652,876, filed Apr. 1, 2020, which is a U.S. National Phase application pursuant to 35 U.S.C. § 371 of International Application No. PCT/EP2018/076710 filed Oct. 2, 2018, which claims priority to EP patent application Ser. No. 17/194,377.2 filed Oct. 2, 2017. The entire disclosure contents of these applications are herewith incorporated by reference into the present application.

TECHNICAL AREA

The present invention relates to a primary packaging for a liquid.

BACKGROUND

Primary packagings are packaging means such as vials, ampules, carpules, bottles, glasses or cans which come into direct contact with foodstuffs or medicines. Such packagings may be manufactured from various materials, for example from plastics materials, metals, glasses or ceramics. Outer packagings that are not in direct contact with the foodstuffs or medicines are referred to as secondary packagings, and accordingly do not constitute primary packagings.

Increased demands are placed specifically on primary packagings in the pharmaceutical sector. These must therefore make it possible for a pharmaceutical agent to be stored over a relatively long period of time without escaping from the packaging. At the same time, the agent contained therein must be protected against external influences such as oxygen, moisture or UV radiation. Not least, the primary packaging must not cause contamination of the preparation, for example as a result of introduction of additives from plastics materials. Specifically in the case of liquid pharmaceutical agents for parenteral administration, the demands in this regard are particularly high.

In this context, U.S. Pat. No. 5,364,384 discloses a primary packaging for a liquid comprising a collapsible container and a connector element for the connection of the primary packaging to a withdrawal device. Such containers have numerous advantages over other liquid vessels. They are therefore distinguished by high robustness, a low weight and a small space requirement. Said containers are often produced from polyvinyl chloride or ethylene vinyl acetate copolymer. They are commonly formed from two foil parts which are welded together at their four sides. A connector element is welded in between the foils at one side, which connector element permits a withdrawal of liquid from the container via a connector channel.

Such primary packagings have become established for numerous pharmaceutical applications, in particular for injection or infusion solutions. In this context, there is however the problem that the materials that are commonly used still exhibit relatively high permeability to water vapor. Furthermore, additives can easily escape from said plastics and contaminate pharmaceutical compositions. Therefore, the maximum storage duration in such primary packagings is relatively limited. Furthermore, the low mechanical strength, in particular tearing resistance, of known packagings generally also constitutes a problem.

SUMMARY

It is therefore the object of the present invention to overcome the above-stated disadvantages in the prior art. In particular, it is an object of the present invention to create a versatile primary packaging of the type mentioned above, in which pharmaceutical agents can be stored over a relatively long period of time without a change occurring in the preparation. The primary packaging should furthermore be capable of being produced and sterilized in a conventional manner, and exhibit high mechanical strength. Furthermore, the packaging should satisfy all regulatory requirements.

Said objects are achieved by means of a primary packaging which has the features in the independent claim(s). The primary packaging for a liquid comprises an in particular at least partially collapsible container and a connector element for the connection of the primary packaging to a withdrawal device. The connector element has at least one connector channel which is in fluid communication with an interior space of the container. The container is composed at least partially of a foil which is constructed from a first layer which, during intended use of the primary packaging, comes into direct contact with the liquid. Both the first layer and the connector element are composed of a plastics material comprising a cyclic olefin polymer.

Cyclic olefin polymers are a class of polymers which can be produced from at least one monomer which is a cyclic olefin. Said class is further divided into cyclic olefin homopolymers and cyclic olefin copolymers. Cyclic olefin polymers are distinguished by excellent barrier characteristics with respect to water vapor. Furthermore, they can be used technically with a high degree of purity, whereby minimal use of additives is possible. In this way, an introduction of foreign substances into a pharmaceutical composition contained in a primary packaging according to the invention is substantially prevented. Cyclic olefin polymers are furthermore free from halogens and bisphenol A. They have high mechanical resilience and excellent optical characteristics, in particular transparency. Furthermore, cyclic olefin polymers can be easily sterilized, be it by vapor sterilization, gamma radiation, ethylene oxide or UV radiation.

An advantage of a primary packaging according to the invention is in particular that, during the intended use thereof, a liquid contained therein comes into contact only with cyclic olefin polymers. In this way, with such a packaging, it can be ensured far more easily that all regulatory requirements are satisfied.

The fraction of cyclic olefin polymer in the plastics material of the first layer and/or of the connector element may amount to at least 60 wt %, preferably at least 80 wt %, more preferably at least 90 wt %. It has been found that the above-described advantageous characteristics can be achieved to a higher degree with a higher fraction of cyclic olefin polymer.

The first layer and the connector element may be composed of two different plastics materials, each comprising a cyclic olefin polymer. In this way, the specific characteristics of the plastics materials used can be targetedly adapted for the respective parts of the primary packaging. Accordingly, for the collapsible container, use may be made of a cyclic olefin polymer composition which can be particularly easily extruded to form foils. By contrast, for the connector element, a composition may be selected which is particularly well suited to processing by injection molding.

The at least one cyclic olefin polymer may be selected from a cyclic olefin homopolymer and a cyclic olefin copolymer. Whereas cyclic olefin homopolymers are constructed only from monomers which are cyclic olefins, cyclic olefin copolymers are composed firstly of monomers which are cyclic olefins but secondly also of further monomers, in particular acyclic olefins. Here, ethene in particular has proven expedient as an acyclic olefinic monomer. However, other monomers, for example propene, may also be used. Here, cyclic olefin copolymers offer the advantage that the characteristics thereof can be influenced in targeted fashion by means of the monomer composition. This allows further freedom for obtaining the desired material characteristics.

The at least one cyclic olefin polymer may be producible from a monomer selected from a list composed of cyclopentene, cyclohexene, norbornene, dicyclopentadiene, tetracyclodecene and methyltetracyclodecene. These are monomers which are particularly well suited to the production of cyclic olefin polymers.

The first layer commonly has a thickness of 5 μm to 200 μm, preferably of 10 μm to 100 μm, more preferably of 20 μm to 60 μm.

In the case of such a primary packaging, the foil may be constructed from at least one further second layer. The foil can thus be equipped with further technical characteristics or functions that may be required. Accordingly, the at least one further layer may be composed of a plastics material comprising a fluoropolymer. Such a foil has not only the abovementioned barrier characteristic with respect to water vapor but also extremely low permeability to oxygen and other gases. Here, the fluoropolymer may be selected from a list composed of polyvinyl fluoride, polyvinylidene fluoride, polytetrafluoroethylene, polychlorotrifluoroethylene, ethylene tetrafluoroethylene and perfluoro(ethylene-propylene). Specifically these fluoropolymers exhibit a particularly good barrier action with respect to oxygen.

The at least one further second layer advantageously has a thickness of 10 μm to 500 μm, preferably of 25 μm to 250 μm, more preferably of 50 μm to 150 μm.

Here, at least one adhesion promoter layer may be arranged between the first and the second layer. This contributes to better adhesion of the first and the second layer to one another. The adhesion promoter layer commonly has a thickness of 1 μm to 100 μm, preferably of 5 μm to 50 μm, more preferably of 7 μm to 25 μm. It is self-evidently conceivable for multiple adhesion promoter layers to be used, which may have different characteristics depending on the adjacent foil layers.

In the case of a primary packaging according to the invention, the connector channel may be closed by means of a septum. Such a septum offers the advantage that the content of the container is very easily accessible by virtue of said septum being pierced. Substantial sterility is ensured.

The septum may be formed as a single piece with the connector element. In this way, the connector channel can be sealingly closed in an efficient manner. Furthermore, during the production of the primary packaging, there is no need for a septum in the form of a separate part to be inserted into the connector channel. A connector element with integrally formed septum can be produced in a very efficient and inexpensive manner in particular by means of injection molding.

A seal element may additionally be arranged on the septum. This is advantageous in particular if the septum, when pierced by means of a cannula, is not elastic enough to form a fluid-tight transition from the connector channel to the cannula.

The connector element may have at least one additional filling channel which is in fluidic communication with an interior space of the container. If such a filling channel is present, the packaging can, in the assembled state, be filled with a liquid. Since the connector channel is not required for this purpose, it can already be closed by means of a septum, which does not need to be pierced for this purpose. The filling channel can be closed by means of a plug.

If the primary packaging has only a single connector channel, it may also be closed by means of a plug at said connector channel. If the primary packaging has a connector channel and a filling channel, it may be closed by means of a plug at the connector channel and/or at the filling channel.

Preferably, this plug is also composed, or these plugs are also composed, of a cyclic olefin polymer as described above.

The plug may however also be designed such that a septum is formed as a layer on the surface of the plug. In this case, the plug is designed such that the septum formed as a layer faces toward the interior space of the container when the plug has been inserted as intended. In this case, the septum, as a single part of the plug, may be composed of cyclic olefin polymer. The rest of the plug may be produced from an inexpensive, easily processable or durable material. It can nevertheless thus be ensured that a liquid contained in the container comes into contact only with cyclic olefin polymers. A plug according to the invention may be produced for example by means of a multicomponent injection molding process.

The primary packaging may however also be closed or closable by means of at least one plug which is formed from a septum and a seal element. The septum may be of cup-shaped form. In this context, cup-shaped means that the septum is present as a hollow cylinder which is closed at a longitudinal end. In other words, the septum has the shape of a hollow cylinder including a base surface. A septum present in this way forms, in the hollow cylinder interior, a receptacle for a seal element. Such a seal element may be fitted into the receptacle in the two-component injection molding process, or may be pressed into the receptacle. Other production methods are however also conceivable.

An advantage of a cup-shaped seal element which has a seal element in the hollow cylinder interior is that the sealing action of the septum is improved. This is because the septum is preferably composed of cyclic olefin polymers, which material has numerous advantages but is not necessarily suitable as a sealing material. In a particularly preferred embodiment, the septum, which has been inserted as intended, has, on the side averted from the interior space of the container, an undercut, preferably a collar-like undercut, into which a seal element introduced into the hollow cylinder interior can be engaged with detent action. The closure is additionally improved by means of a seal element thus engaged with detent action.

It is preferable for the septum to be composed of a plastics material comprising a cyclic olefin polymer. The cyclic olefin polymer is preferably composed of a mixture of cyclic olefin copolymer and a cyclic olefin copolymer elastomer.

In a preferred embodiment, the COC-based inner layer of the foil is formed from a first plastic comprising cyclic olefin copolymer and a cyclic olefin elastomer. The connection element is preferably formed from a second plastic comprising cyclic olefin copolymer and a cyclic olefin elastomer. The optional septum may be formed from a third plastic comprising cyclic olefin copolymer and a cyclic olefin elastomer. Here, the fraction of cyclic olefin copolymer in the first plastic is preferably lower, and the elastomer fraction preferably higher, than in the second plastic. At the same time or alternatively, the fraction of cyclic olefin polymer in the third plastic may be higher, with a simultaneously lower elastomer fraction, than in the second plastic.

In the context of this application, a cyclic olefin elastomer is to be understood to mean a partially crystalline elastomer which comprises cyclic olefinic repeating units and which has a glass transition temperature at room temperature (20° C.) or below. For example, the elastomer may be an ethylene/norbornene copolymer elastomer with a norbornene fraction of 8 to 9 mol %, which has a rubber-like transition state between 10° to 20° C. and 80° to 90° C. Such elastomers typically have a 10 to 30% degree of crystallinity. By contrast, conventional cyclic olefin polymers or cyclic olefin copolymers are amorphous at room temperature. For example, as a cyclic olefin elastomer, use may be made of Topas elastomer E-140 from Topas Advanced Polymers.

By means of this construction, it can be ensured that a septum of relatively rigid form can perform its sealing function, and a relatively flexible foil is used which is well suited to forming an at least partially collapsible container, while it is ensured that the liquid contained in the container comes into contact exclusively with cyclic olefin polymer.

A further aspect of the invention relates to a primary packaging as described above, wherein the at least one filling channel and/or connector channel formed on the connector element is/are, in the direction of the mouth attachment, formed as a narrowing pipe, which form(s) a sealing lip in the direction of the interior space of the container. Such a sealing lip ensures that, in the case of any positive pressure in the container, the sealing action does not for example degrade, but rather the pressure is transmitted to the sealing lip and the secure closure after the filling process is thus ensured.

A further aspect of the invention relates to a primary packaging as described above, wherein a top-side and a rear-side foil of the container are, in that part of the container which is adjacent to the filling channel (12), welded such that a shaft is left free in certain portions between the top-side and the rear-side foil surfaces. Such an embodiment has proven to be expedient in particular for the method according to the invention (below). The shaft which is left free in certain portions has a diameter which is smaller than the diameter of the interior space. The shaft preferably has a diameter <15 mm, preferably a diameter of <10 mm, particularly preferably a diameter of <5 mm, whereas the interior space of the container preferably has a diameter of several centimeters.

A further aspect of the invention relates to a primary packaging, in particular as described above, wherein the at least partially collapsible container is formed from a top-side and a rear-side foil, wherein said foils are laterally welded together, and the connector element is, at least in certain portions, welded in between the top-side and the rear-side foil. It is preferable here that the connector element tapers at the region directed toward the interior space of the container. In a side view, the connector element therefore has a side-elevation outline that tapers toward the interior space of the container. Additionally or alternatively, in a plan view directed onto the withdrawal region, the connector element may be of boat-shaped form, that is to say may have two end sides which extend away from one another and which taper in acute or obtuse fashion.

It is preferable for sealing beads to be formed on the connector element at the region directed toward the interior space of the container. In the context of this invention, a sealing bead is to be understood to mean a protuberance on the connector element, which protuberance is preferably of semicylindrical form, wherein the semicylinder particularly preferably has a radius of 0.1 to 0.5 mm. The sealing bead extends over a first longitudinal side of the connector element, where the connector element is welded to the top-side foil sheet, and/or over a second longitudinal side of the connector element, where the connector element is welded to the rear-side foil sheet, around the respective mouth region of the connector channel.

It is an advantage both of the preferred geometry of the connector element and of the sealing beads that the sealing action of the connection of top-side and/or rear-side foil sheet and connector element is improved.

A primary packaging according to the invention may contain a liquid pharmaceutical agent or diagnostic agent, in particular selected from a list composed of the following media:

i. analgesics
ii. chemotherapeutic agents
iii. hormones
iv. psychotherapeutic drugs
v. anesthetics
vi. antidiabetics
vii. antiallergics
viii. anticoagulants
ix. antibiotics
x. diuretics
xi. vaccines
xii. laxatives
xiii. sedatives
xiv. cardiac agents
xv. contrast agents.

In one particular embodiment, the pharmaceutical agent is a monoclonal antibody.

The invention then relates to a method for filling a primary packaging as described above, comprising the following steps:

i. introducing a fluid via the connector channel or the filling channel into the primary packaging from a fluid line into the container;
ii. clamping off that region of the container which is adjacent to the filling channel, which region is formed at least in certain portions as a shaft left free between the top-side and the rear-side foil surfaces;
iii. removing the fluid line from the connector channel or from the filling channel;
iv. introducing a plug into the connector channel or the filling channel;
v. releasing the clamping-off action.

An advantage of the method according to the invention is that, during the filling process, a slight positive pressure can be built up and maintained until the channel is closed by means of the plug. This reduces the risk of enclosed gas bubbles, and the filling process is made more efficient.

For example, a clamping-off action may be realized by means of a clamp device on a housing in which the primary packaging is situated. For example, the primary packaging may be inserted in a housing composed of polycarbonate. The housing may be of partially flexible form or have flexible elements, such as film hinges. In this way, the side surfaces of the housing can be moved against one another by mechanical pressure. If clamping-off devices, for example clamping-off ribs, are formed on the housing inner sides, these can, in the case of the shaft formed in certain portions between the top-side and the rear-side foil surface, be pressed against one another in the mouth region of the filling channel, such that, after the filling process has taken place, clamping-off of the shaft is performed, this being maintained until the container has been closed by means of a plug.

BRIEF DESCRIPTION OF DRAWINGS

Further advantages and individual features of the invention will emerge from the following description of an exemplary embodiment and from the drawings.

In the drawings, in each case schematically.

DETAILED DESCRIPTION

Figure 1:
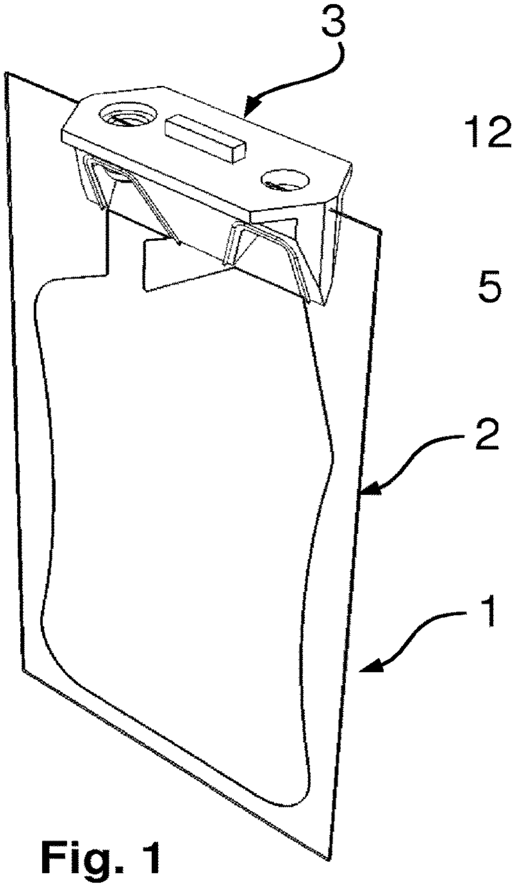
FIG. 1 shows a perspective illustration of a primary packaging according to the invention.
Figure 2:
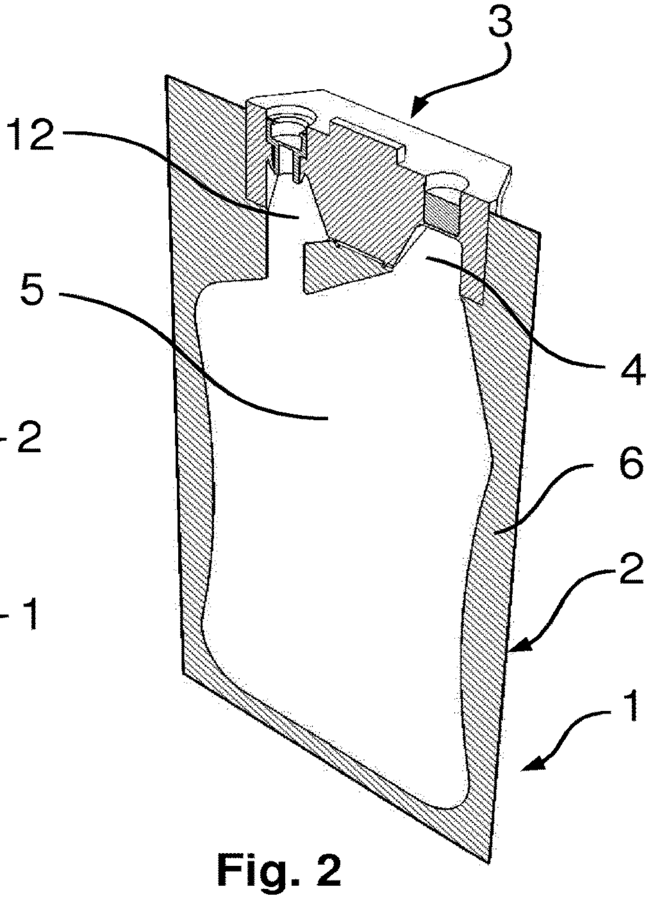
FIG. 2 shows a perspective sectional illustration of the primary packaging as per FIG. 1.
Figure 3:
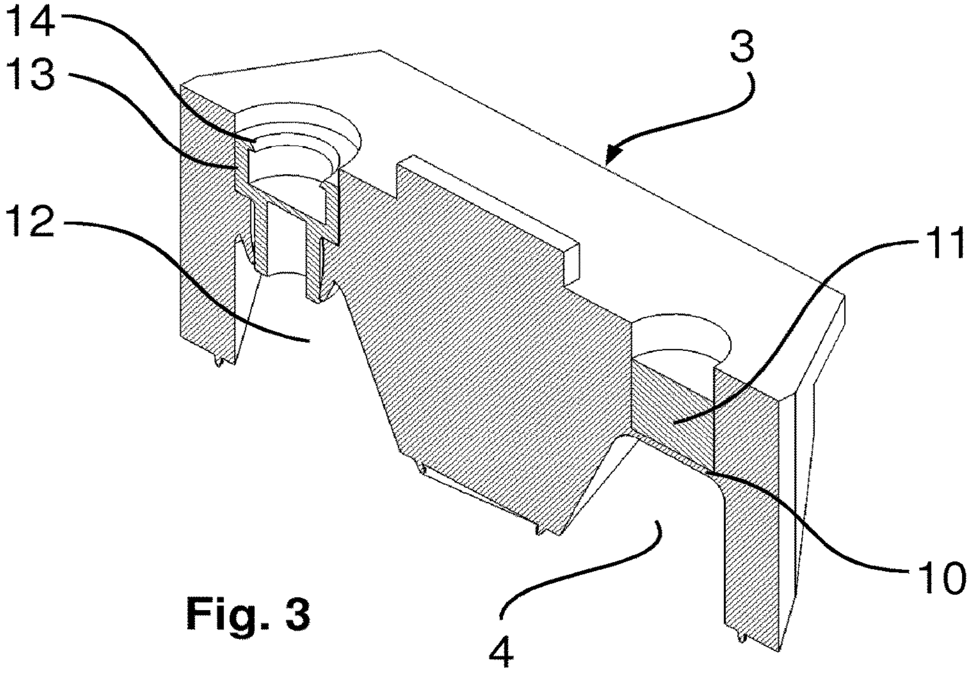
FIG. 3 shows a perspective sectional illustration of the connector element of the primary packaging as per FIG. 1.

FIGS. 1 and 2 show a first exemplary embodiment of a primary packaging 1 according to the invention. The primary packaging 1 comprises a collapsible container 2 which is formed from two foils 6 which lie one over the other and which are welded to one another at their edges. Owing to the selection of the section plane in FIG. 2, only one of the two foils 6 is visible in said figure. At the upper, short edge of the foils 6, the connector element 3 is welded in between the foils 6. This makes it possible to produce fluidic communication between a withdrawal device and the interior space 5 of the container 2. FIG. 3 shows more details regarding the connector element 3. It can be seen that said connector element has a connector channel 4 and a filling channel 12. The connector channel 4 is closed by means of a septum 10, which is formed as a single piece with the connector element 3. Attached to the outer side of the septum is a seal 11 which, when the septum 10 is penetrated with a cannula, prevents leaks from occurring at the transition of the septum 10 to the cannula. The seal 11 is elastically deformable for this purpose. By contrast, the filling channel 12 is closed by means of a plug 13 having an upper edge 14, which in the example shown here is, like the connector element 3, composed of a cyclic olefin polymer.

Figure 4:
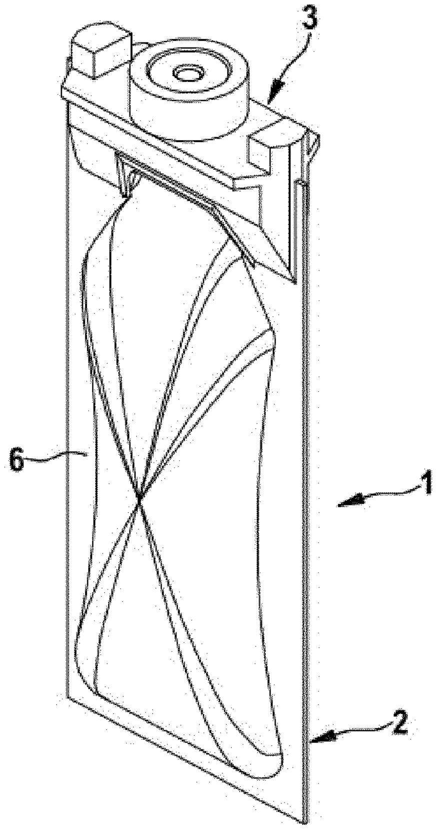
FIG. 4 shows a perspective illustration of an alternative exemplary embodiment of a primary packaging according to the invention.
Figure 5:
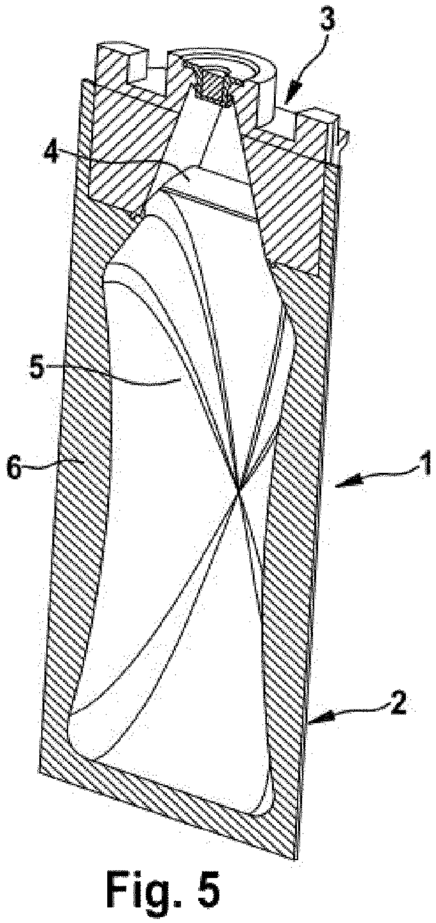
FIG. 5 shows a perspective sectional illustration of the Primary packaging as per FIG. 4.
Figure 6:
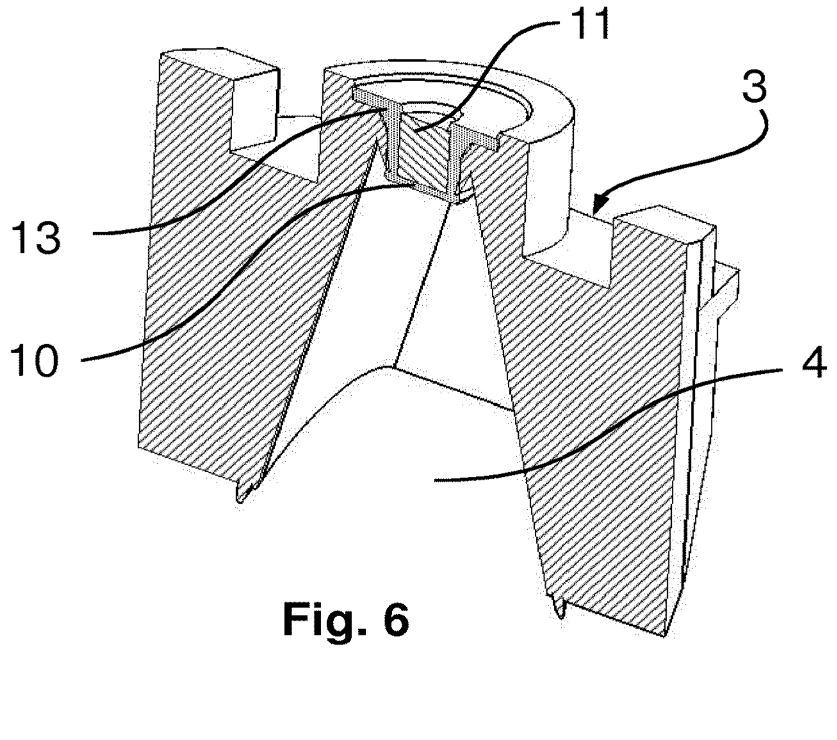
FIG. 6 shows a perspective sectional illustration of the connector element of the primary packaging as per FIG. 4.

FIGS. 4 and 5 show an alternative exemplary embodiment of a primary packaging 1 according to the invention. The container 2 has in this case the same foil construction as described in the introduction. However, the connector element 3 is equipped with a single connector channel 4. FIG. 6 shows more details regarding the connector element 3. It can be seen that the connector channel 4 has been closed by means of a plug 13. Formed as a single piece with the plug 13 is a septum 10 which can be pierced by a cannula for the purposes of producing a fluidic connection between the interior space 5 of the container 2 and a withdrawal device. Again, a seal 11 is arranged on the outer side of the septum 10.

Figure 7:
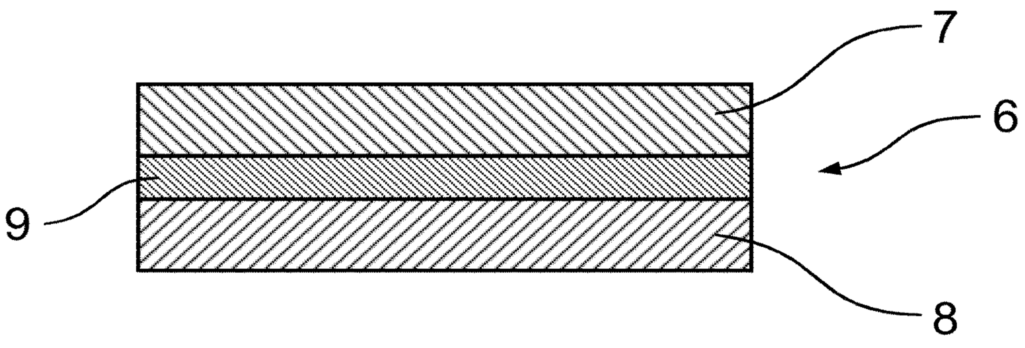
FIGS. 7 and 8 show cross-sectional illustrations of foils of primary packagings according to the invention.
Figure 8:
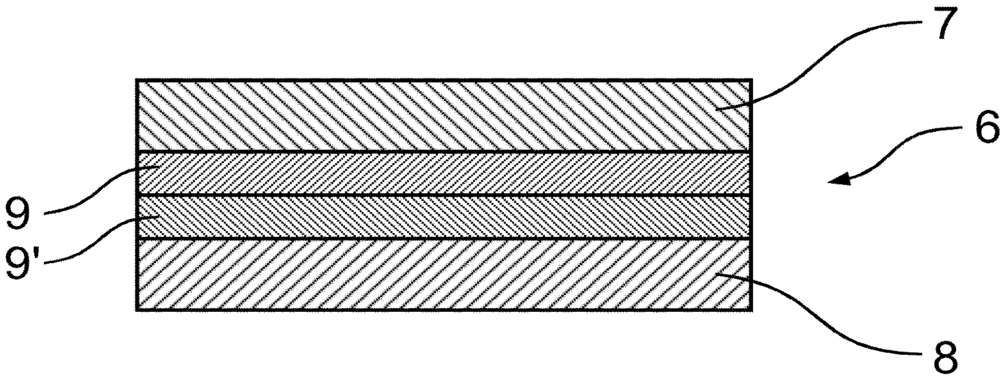

FIGS. 7 and 8 show two possible variants for a layered structure of the foil 6 of a primary packaging 1 according to the invention. The first layer 7 is a cyclic olefin polymer. Also provided is a second layer 8, which is a polychlorotrifluoroethylene (PCTFE). In the variant as per FIG. 7, a single adhesion promoter layer 9 has been applied between the first layer 7 and the second layer 8. In the example as per FIG. 8, two adhesion promoter layers 9, 9' have been applied between the first layer 7 and the second layer 8. The first adhesion promoter layer 9 is in this case selected so as to form a good connection with the first layer and the second adhesion promoter layer 9'. The second adhesion promoter layer 9' is selected so as to form a good connection with the second layer 8 and the first adhesion promoter layer 9. In the present example, the second layer composed of PCTFE performs the function of providing a barrier layer for oxygen and other gases.

Figure 9:
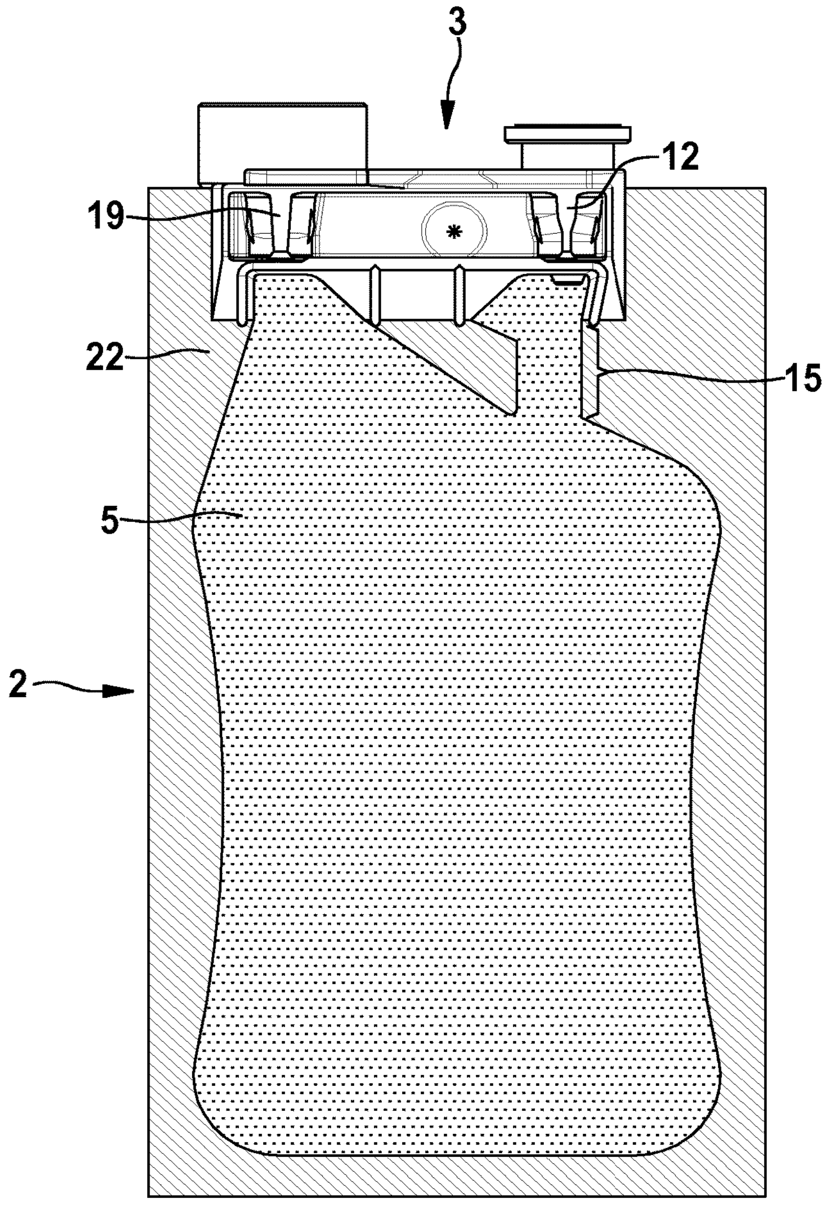
FIG. 9 shows a view of a longitudinal side of a connector element, wherein the connector element has been welded in certain regions between a top-side and a rear-side foil.

FIG. 9 shows a side view of a longitudinal side of a connector element 3, wherein the connector element has, in certain regions, been welded in between a top-side and a rear-side foil. The top-side and rear-side foils have been welded together in the weld region 22 and thus form the container 2. The connector element 3 together with the top-side and rear-side foils 2 form the primary packaging. In this exemplary embodiment, the connector element 3 has a filling channel 12 and a withdrawal channel 19. The top-side and the rear-side foil have been welded together such that, in that part of the container 2 which is adjacent to the filling channel 12, said foils leave a shaft 15 free in certain portions between the top-side and the rear-side foil surfaces. The shaft has a diameter smaller than the diameter of the interior space 5. Preferably, the shaft 15 has a diameter of $<10$ mm, particularly preferably a diameter of $<5$ mm.

Figure 10:
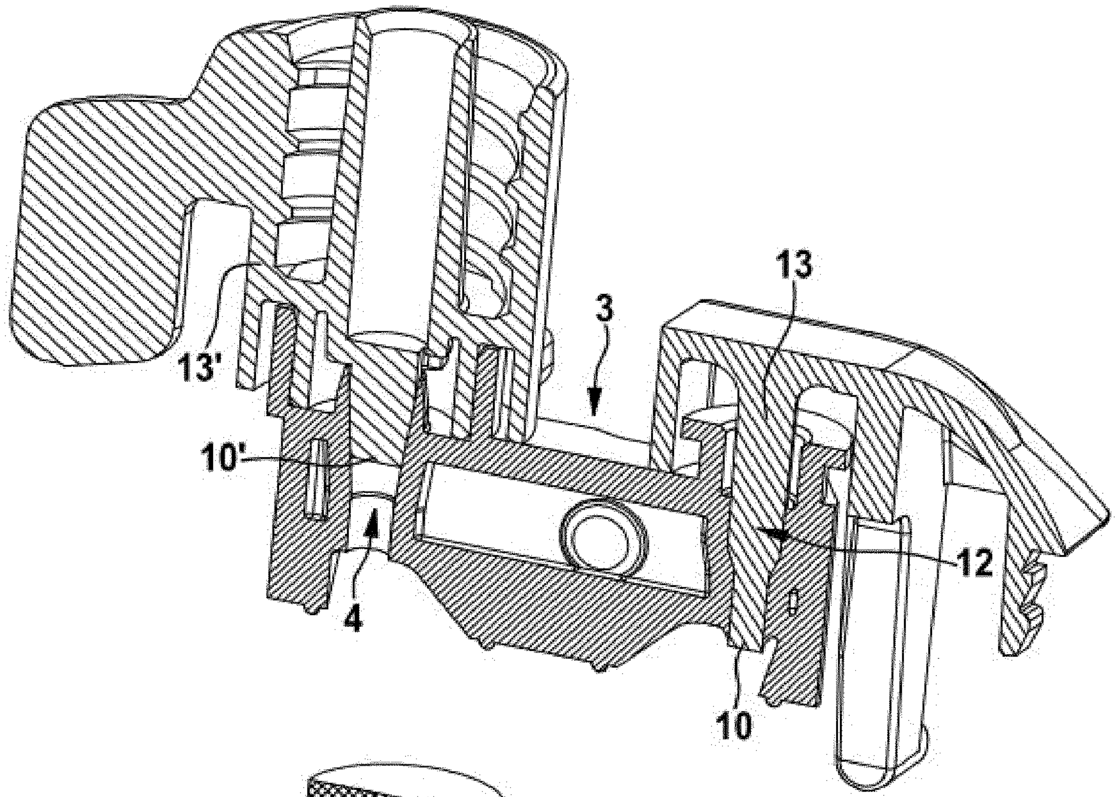
FIGS. 10 and 11 show perspective views of a longitudinal section through the withdrawal region of the primary packaging (without and with container/closure elements/housing).

FIG. 10 shows a perspective view of a longitudinal section through the connector element 3. The plugs 13 and 13' have been fitted onto the connector element in FIG. 10.

Figure 11:
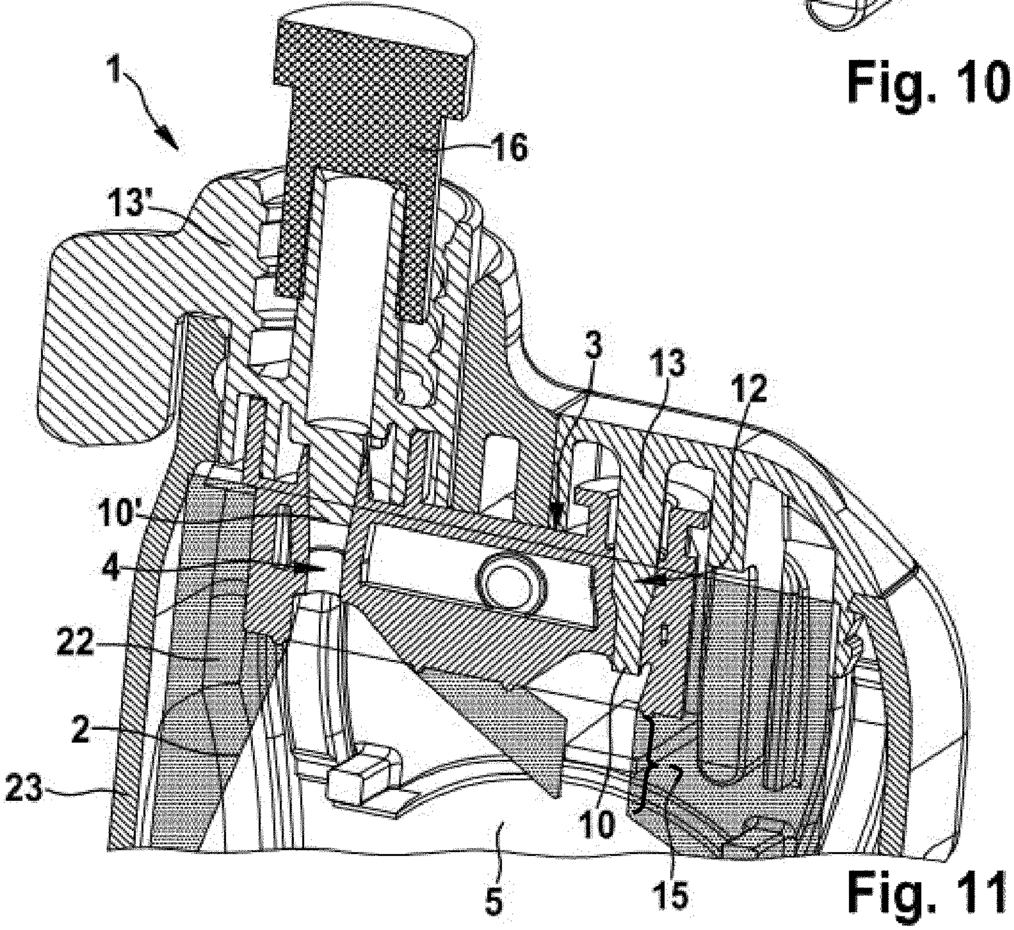

FIG. 11 shows a perspective view of a longitudinal section through the withdrawal region of the primary packaging 1, that is to say through connector element 3 and container 2. Plugs 13, 13' and a protective cap 16 have been fitted onto the connector element. The primary packaging has been inserted into a housing 23.

In both figures, a septum 10, 10' of that side of at least one plug 13, 13' which faces toward the container interior may be formed as a layer on the surface, such that, when the plug has been inserted as intended, the septum points toward the interior space of the container 2.

Figure 12:
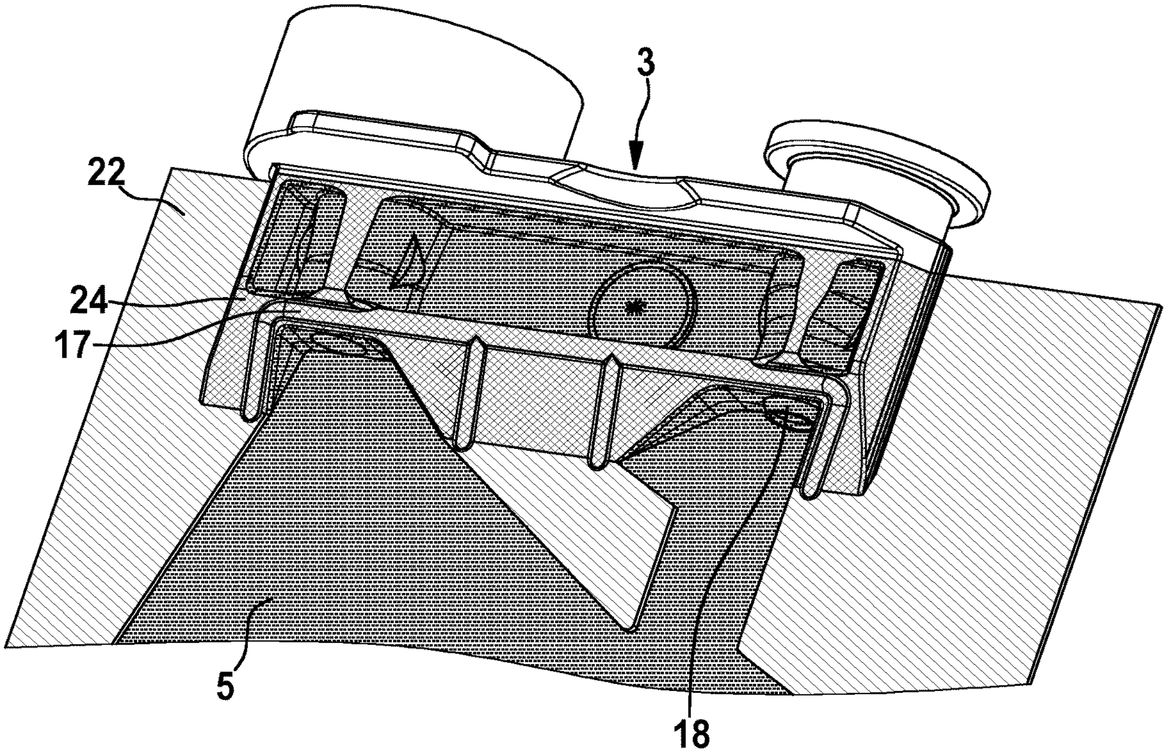
FIG. 12 shows a perspective view of the withdrawal region of the primary packaging.

FIG. 12 shows a perspective view of the withdrawal region of the primary packaging. In this view, it can be seen that the connector element 3 tapers toward the container interior space 5. It can also be seen that the connector element 3 may, in plan view, be of boat-shaped form, that is to say the longitudinal ends also taper in obtuse fashion when the connector element is viewed from the filling direction. From FIG. 12, it can furthermore be seen that the top-side foil has been welded to the rear-side foil in the weld region 22, and thus encloses the interior space 5. In the region of the dark hatching 22, the foils have been welded together. In the region of the medium-dark hatching 24, the top-side foil has been welded to the connector element 3. In the regions with the light hatching, for example in the container interior space 5, the top-side foil has not been welded. Particularly good sealing action of the weld of foil and connector element arises at the sealing bead 17. The sealing bead is formed here as a comb-shaped protuberance along the connector element, wherein the prongs of the comb shape extend around the mouth regions of filling and withdrawal channels, in the direction of the container interior 5.

Figure 13:
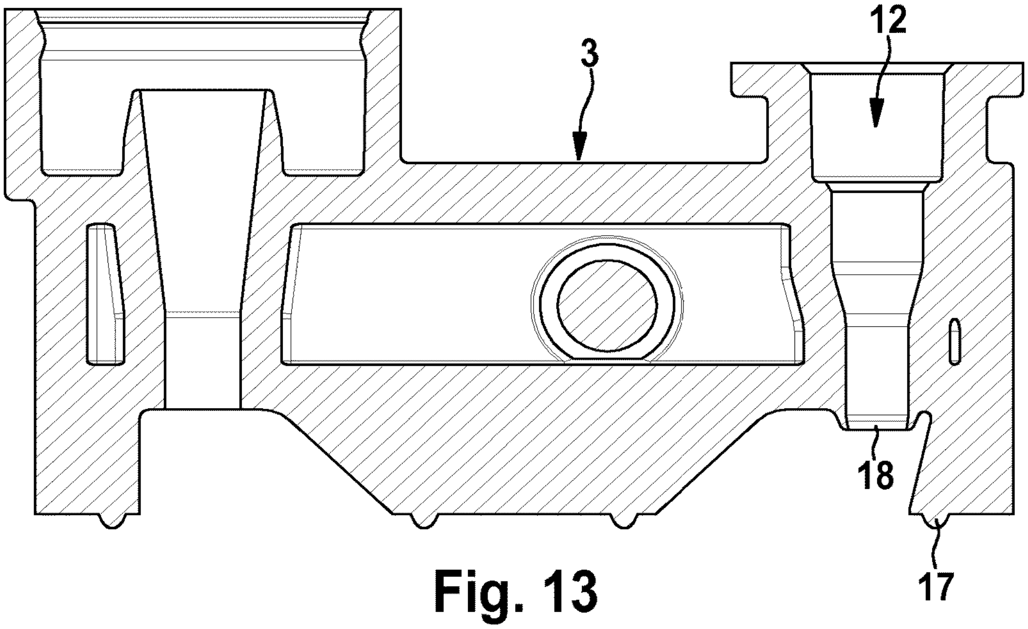
FIG. 13 shows a longitudinal section through a connector element with filling channel and withdrawal channel.

FIG. 13 shows a longitudinal section through a connector element. Again, it is possible to see sealing bead portions 17, which, at that end of the connector element which points towards the pouch interior, project beyond the body of the connector element and are thus visible in the longitudinal section through the connector element as semicircular protuberances.

It can likewise be seen from FIG. 13 how the filling channel 12 is, in the direction of the mouth attachment, formed as a narrowing pipe, which forms a sealing lip 18 in the direction of the interior space of the container (not shown). With increasing pressure in the interior space of the container (not shown), the sealing lip presses with ever greater intensity against a plug (not shown) situated in the filling channel 12, such that the sealing action of the closure is improved.

Figure 14:
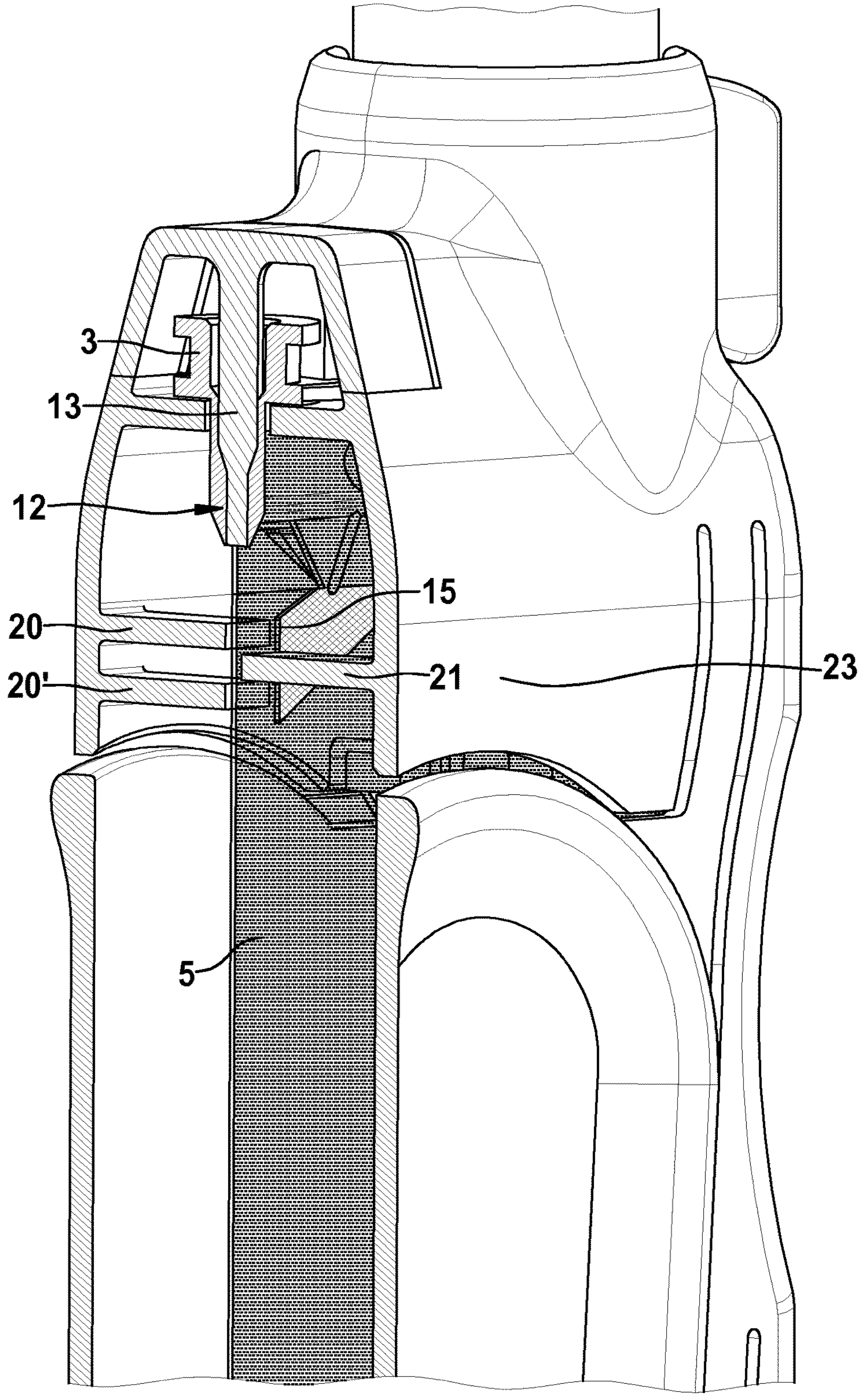
FIG. 14 shows a detailed view of a cross section through a filling channel on the connector element with container, inserted into a housing.

FIG. 14 shows a detail view of a cross section through a filling channel 12 on the connector element 3. The filling channel 12 has been closed by means of a plug 13. The primary packaging has been placed into a housing 23. It can be seen how the top-side and a rear-side foil of the container 2 have been welded, in that part of the container 2 which is adjacent to the filling channel 12, such that a shaft 15 is left free between the top-side and the rear-side foil surfaces. The shaft has a diameter of a few millimeters, whereas the container interior 5 forms a space with a diameter of several centimeters. The shaft 15 thus formed can be clamped off by means of clamping-off ribs 20, 20, 21' formed on the housing. In FIG. 14, two clamping-off ribs 20, 20' have been formed on the rear side of the housing, and one clamping-off rib 21 has been formed on the front side of the housing. The clamping-off ribs are arranged in a spatially offset manner. The housing is in this case of slightly flexible form, such that, as a result of pressure on the front and rear sides, pressure can be exerted, for example in automated fashion, in each case at the level of the clamping-off ribs after the filling of the primary packaging. In this way, the fluid is enclosed in the primary packaging. This results in a time period in which a filling cannula can be removed, and the plug 13 inserted, without fluid escaping from the container, even in the case of a slight positive pressure prevailing in the pouch interior. At the same time, air is prevented from entering the container. The filling process is thus simplified and made more efficient and reliable.

The invention claimed is:

1. A primary packaging for a liquid comprising:

an at least partially collapsible container, and a connector element for connection of the primary packaging to a withdrawal device, wherein the connector element has at least one connector channel which is in fluid communication with an interior space of the at least partially collapsible container, wherein the connector element has at least one sealing bead formed as a comb shaped protuberance along a periphery of the connector element, wherein the comb shaped protuberance includes prongs directed toward the interior space of the at least partially collapsible container, wherein the at least one connector channel, formed on the connector element, is, in a direction of a mouth attachment, formed as a narrowing pipe that tapers from a first pipe diameter to a second pipe diameter, wherein the at least partially collapsible container is composed at least partially of a foil which is constructed from a first layer which, during intended use of the primary packaging, comes into direct contact with the liquid, wherein the narrowing pipe forms a sealing lip in a direction of the interior space of the at least partially collapsible container configured to press against a plug situated in the at least one connector channel, and wherein both the first layer and the connector element are composed of a plastics material comprising at least one cyclic olefin polymer.

2. The primary packaging according to claim 1, wherein a fraction of the at least one cyclic olefin polymer, in at least one of the plastics material of the first layer and the connector element, amounts to at least 60 wt %.

3. The primary packaging according to claim 1, wherein the first layer and the connector element are composed of two different plastics materials, each comprising a cyclic olefin polymer.

4. The primary packaging according to claim 1, wherein the at least one cyclic olefin polymer is selected from the group consisting of a cyclic olefin homopolymer and a cyclic olefin copolymer.

5. The primary packaging according to claim 1, wherein the at least one cyclic olefin polymer is producible from a monomer selected from a group consisting of cyclopentene, cyclohexene, norbornene, dicyclopentadiene, tetracyclododecene and methyltetracyclododecene.

6. The primary packaging according to claim 1, wherein the foil is constructed from at least one further second layer.

7. The primary packaging according to claim 6, wherein the at least one further second layer is composed of a plastics material comprising a fluoropolymer.

8. The primary packaging according to claim 7, wherein the fluoropolymer is selected from the group consisting of polyvinyl fluoride, polyvinylidene fluoride, polytetrafluoroethylene, polychlorotrifluoroethylene, ethylene tetrafluoroethylene and perfluoro (ethylene-propylene).

9. The primary packaging according to claim 6, wherein at least one adhesion promoter layer is arranged between the first layer and the at least one further second layer.

10. The primary packaging according to claim 1, wherein the at least one connector channel is closed by a septum.

11. The primary packaging according to claim 10, wherein the septum is formed as a single piece with the connector element.

12. The primary packaging according to claim 10, wherein a seal element is arranged on the septum.

13. The primary packaging according to claim 10, wherein the septum is formed as a layer on a surface of the plug, such that the septum, formed as the layer, faces toward the interior space of the at least partially collapsible container when the plug is inserted as intended.

14. The primary packaging according to claim 13, wherein the septum is of cup-shaped form, and a hollow cylindrical interior of the cup-shaped septum forms a receptacle for a seal element.

15. The primary packaging according to claim 14, wherein the septum, when inserted as intended, has, on a longitudinal side averted from the interior space of the at least partially collapsible container, an undercut into which the seal element, introduced into the hollow cylinder interior and engaged by a detent action.

16. The primary packaging according to claim 10, wherein the septum is composed of a plastics material comprising a cyclic olefin polymer.

17. The primary packaging according to claim 1, wherein the connector element has at least one additional filling channel which is in fluidic communication with the interior space of the at least partially collapsible container.

18. The primary packaging according to claim 1, wherein the first layer of the foil is formed from a first plastic comprising cyclic olefin polymer and a cyclic olefin elastomer;

the connector element is formed from a second plastic comprising cyclic olefin polymer and a cyclic olefin elastomer; and a relative fraction of cyclic olefin polymer in the first plastic is lower, and a relative fraction of cyclic olefin elastomer is higher, than in the second plastic.

19. A method for filling a primary packaging according to claim 1, wherein a top-side and a rear-side foil of the at least partially collapsible container are, in that part of the at least partially collapsible container which is adjacent to the at least one connector channel or a filling channel, welded such that a shaft is left free in certain portions between the top-side surface and the rear-side foil surface, which has a slot that has a diameter smaller than a diameter of the interior space, the method comprising the following steps:

introducing a fluid, via the at least one connector channel or the filling channel, into the primary packaging from a fluid line into the at least partially collapsible container;

clamping off a region of the at least partially collapsible container which is adjacent to the at least one connector channel or the filling channel, the region is formed at least in certain portions as a shaft left free between the top-side surface and the rear-side foil surface;

removing the fluid line from the at least one connector channel or from the filling channel;

introducing the plug into the at least one connector channel or the filling channel; and releasing the clamping-off action.

* * * * *